(12) United States Patent
De Lamberterie et al.

(10) Patent No.: US 10,634,311 B2
(45) Date of Patent: Apr. 28, 2020

(54) LENS FOR SHAPING LIGHT RAYS FOR A LIGHTING MODULE FOR LIGHTING AND/OR SIGNALLING FOR A MOTOR VEHICLE

(71) Applicant: VALEO VISION, Bobigny (FR)

(72) Inventors: Antoine De Lamberterie, Bobigny (FR); Samira Mbata, Bobigny (FR); Nicolas Lefaudeux, Bobigny (FR); Thomas Canonne, Bobigny (FR); Vincent Dubois, Bobigny (FR); Francois-Xavier Amiel, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 16/129,388

(22) Filed: Sep. 12, 2018

(65) Prior Publication Data
US 2019/0078756 A1 Mar. 14, 2019

(30) Foreign Application Priority Data
Sep. 12, 2017 (FR) ...................................... 17 58438

(51) Int. Cl.
| | |
|---|---|
| *F21V 5/00* | (2018.01) |
| *F21V 5/04* | (2006.01) |
| *G02B 5/02* | (2006.01) |
| *G02B 3/08* | (2006.01) |
| *G02B 27/00* | (2006.01) |
| *G02B 5/18* | (2006.01) |
| *F21S 41/20* | (2018.01) |
| *F21S 43/20* | (2018.01) |

(52) U.S. Cl.
CPC .............. *F21V 5/005* (2013.01); *F21S 41/28* (2018.01); *F21S 43/26* (2018.01); *F21V 5/045* (2013.01); *G02B 3/08* (2013.01); *G02B 5/021* (2013.01); *G02B 5/0278* (2013.01); *G02B 5/189* (2013.01); *G02B 27/005* (2013.01)

(58) Field of Classification Search
None
See application file for complete search history.

(56) References Cited

U.S. PATENT DOCUMENTS

| | | |
|---|---|---|
| 6,352,359 B1 | 3/2002 | Shie et al. |
| 2005/0226123 A1 | 10/2005 | Kimura et al. |
| 2010/0110558 A1* | 5/2010 | Lee .................... G02B 27/1006 359/639 |
| 2010/0226127 A1* | 9/2010 | Bigliatti ................... F21V 5/00 362/235 |

(Continued)

OTHER PUBLICATIONS

French Preliminary Search Report dated Apr. 30, 2018, in French Application 17 58438 filed Sep. 12, 2017 (with English Translation of Categories of Cited Documents).

*Primary Examiner* — Ashok Patel
(74) *Attorney, Agent, or Firm* — Oblon, McClelland, Maier & Neustadt, L.L.P.

(57) ABSTRACT

A lens for shaping light rays, for a luminous lighting and/or signalling module of a motor vehicle, includes an entrance face for the light rays and an opposite exit face. The lens has a flat-lens shape the exit face of which is equipped with prisms forming a Fresnel structure, at least one of these prisms being equipped on an exterior face with diffractive structures, and the entrance face of which is at least partially equipped with microstructures. The lens applies to motor vehicles.

20 Claims, 3 Drawing Sheets

(56) References Cited

U.S. PATENT DOCUMENTS

| | | |
|---|---|---|
| 2013/0222757 A1 | 8/2013 | Klein et al. |
| 2014/0204592 A1* | 7/2014 | Miyashita ............... F21V 5/002 362/311.06 |
| 2017/0082261 A1 | 3/2017 | Yamada et al. |

* cited by examiner

LENS FOR SHAPING LIGHT RAYS FOR A LIGHTING MODULE FOR LIGHTING AND/OR SIGNALLING FOR A MOTOR VEHICLE

The technical field of the invention is that of lighting modules, for motor-vehicle lighting and/or signalling means.

Motor vehicles are equipped with lighting modules, allowing the projection of a beam allowing the route along which the vehicle is progressing to be lit, or even signals to be transmitted from the vehicle to another road user.

These lighting modules in general include at least one light source and at least one optical deviating element arranged to deviate the light rays emitted by the light source toward at least one beam shaping lens so as to obtain a light beam meeting both the needs of the user of the vehicle and regulatory standards, independently of whether they are with respect to lighting or to signalling. However, the complexity of regulatory standards most often requires a plurality of lenses and/or optical deviating elements to be used, thus complexifying the design, the production and the assembly of such a lighting module or and increasing the manufacturing cost of the vehicle.

Solutions have been developed, in particular with the aim of providing a lighting module comprising a minimum of optical components, for the production of a maximum of lighting and/or signalling functions. This type of lighting module however runs up against the very precise specifications of the standards to be met, and the design of such a lighting module is often onerous and expensive, the products obtained rarely solving the targeted problem fully and completely.

The present invention proposes to mitigate these drawbacks and to offer a lighting module comprising a light source, and optionally an optical deviating element for directing the emitted light rays toward a single beam shaping lens, the lighting module optimally meeting both the needs of the user and the regulatory standards set by the public authorities.

One subject of the invention is therefore a lens for shaping light rays for a lighting module for lighting and/or signalling of a motor vehicle, including an entrance face for the light rays and an exit face opposite the entrance face, the lens having a flat-lens shape the exit face of which is equipped with prisms forming a Fresnel structure, at least one of these prisms being equipped on an exterior face with diffractive structures, and the entrance face of which is at least partially equipped with microstructures.

The expression "flat lens" or "not very curved lens" is understood to mean a lens the average thickness of which is small with respect to the diameter, or with respect to the largest dimension in the main plane of elongation of the lens. In other words, a lens is flat, or not very curved depending on the variation in thickness of the lens, if its average thickness is of a value lower than 20% of said diameter or of said largest dimension, whereas the same ratio for a spherical or aspherical convergent is of about 50%.

The term "prism" should be understood to mean any feature participating in forming a Fresnel structure, the dimension and the inclination of this feature being defined depending on the optical power of the spherical lens that it allows to be replaced. More particularly, the features, or prisms, arranged on the exit face may form a Fresnel structure, the flat lens being a Fresnel lens. The prisms forming the Fresnel structure in particular have an optical face and a draft face, and each of these faces, in particular the optical face, may have a right profile, or indeed follow a curve so as to more precisely control the light beam.

A shaping lens according to the invention thus allows a plurality of functions to be provided: the presence of a Fresnel structure on the exit face of a flat lens allows the same optical power as a more bulky, conventional, spherical or aspherical lens to be obtained, and the presence of diffractive structures on the exterior face of these features, i.e. an optical face (of the feature) turned toward the periphery, or exterior, of the lens, allows all or some of the chromatic aberration of the lens to be corrected, in particular during the projection by the lens of rays for the formation of a cutoff-containing beam. The presence of optical microstructures on the entrance face of the lens participates in the blurring of the projected image, this in particular being useful, once again, in the particular application of projection of a cutoff-containing beam, for decreasing the perception of the chromatic aberration that may potentially appear at the junction between the illuminated zone and the unilluminated zone. It will be understood that the presence of the optical microstructures on the entrance face ray allows the number of diffractive structures required to produce this function for decreasing chromatic aberration to be decreased. This is advantageous in that production of the diffractive structures is difficult to implement and in that it is preferable to be able to space them out, and this is also advantageous because the diffractive structures may lead to the creation of glare because of the dispersion of the rays on exiting the lens.

The shaping lens according to the invention advantageously comprises any one at least of the following attributes implemented individually or in combination:

the prisms extend continuously over the exit face of the lens. The term "continuously" means that the prisms are produced without interruption from a central section up to the periphery of the lens, a prism always being arranged in contact with at least one adjacent prism;

the prisms are distributed between a central zone of the exit face, in which the exterior face, or optical face, of the prisms is smooth, and a peripheral zone of the exit face, in which the exterior face of the prisms is equipped with said diffractive structures. By way of nonlimiting example, provision will possibly be made for a central zone of the exit face of a diameter comprised between 5 and 20 millimetres in which no diffractive structure is arranged on the prisms participating to form the Fresnel structure;

a prism is characterized by a height comprised between 1 micron and 1 millimetre. The height of the prisms is comprised between 50 and 300 microns. The height of a prism is measured between a vertex of this prism and a plane passing through the points of contact between this prism and the adjacent prisms, in a direction perpendicular to this plane. It will be understood that the vertex of a prism is the point of the prism furthest from the central layer of the lens;

the prisms have therebetween a pitch comprised between 100 microns and 1 millimetre, measured between the vertex of a first prism and the vertex of a directly neighbouring second prism. The pitch between the prisms may be regular over the entire exit face;

the diffractive structures have a height comprised between 0.1 and 10 microns. The height of a diffractive structure is measured between a vertex of the diffractive structure and a plane passing through an exterior face of the prism bearing the diffractive structure, in a direction perpendicular to the plane in question;

the height of the diffractive structures increases with distance from the centre of the exit face of the lens. The variation in the height of the diffractive structures is either constant, the difference in height between two adjacent diffractive structures being the same whatever the pair of diffractive structures considered, or gradual, the difference in height between two adjacent diffractive structures close to the centre of the exit face of the lens being smaller than the difference in height between two adjacent diffractive structures further from the centre. Provision will possibly be made for an average height of these diffractive structures to be substantially equal to 1 micron;

diffractive structures arranged on a prism have a pitch comprised between 1 micron and 1 millimetre. The pitch of a diffractive structure is measured between a first point of contact between a diffractive structure and a first adjacent diffractive structure and a second point of contact between a diffractive structure and a second adjacent diffractive structure;

the average pitch between the diffractive structures of a prism is larger than the average pitch between the diffractive structures of a neighbouring prism placed between the prism and the exterior border of the lens. For example, provision will possibly be made for an average pitch substantially equal to 500 microns toward the centre of the exit face and an average pitch substantially equal to 15 microns toward the peripheral edges of this exit face;

the prisms are arranged on the exit face in the form of concentric ring-section or ring patterns, the centre of the rings or of the ring sections being coincident with the optical axis of the lens;

the prisms arranged on the exit face are asymmetric in rotation, i.e. a prism extending to a given distance from the optical axis of the lens, forming a ring or ring sections with centre the optical axis, have a dimension or an inclination that varies along this ring or these ring sections. In particular, the asymmetry will possibly be such that the prismatic power varies as a function of the vertical position of the prisms on the lens and such that the prismatic power is constant as a function of the horizontal position of the prisms on this lens, it being understood that the notions of verticality and horizontality are to be understood with respect to the position of the lens when the lighting module is installed in the vehicle. Since each prism has an exterior face, or optical face, and an interior face, or draft face, it should be noted that the asymmetry in revolution may equally well relate to the optical faces as to the draft faces, depending on the sought-after optical effect. By way of example, provision will possibly be made to vary the inclination of the optical face of the prisms in order to decrease the perception of chromatic aberration, and/or to make the inclination of the draft face vary in order to limit the potential glare generated by the generated beam;

the prismatic power is lower for prisms that are to be placed in the bottom portion of the lens. This arrangement is adopted in order to prevent too great a scattering of rays originating from this bottom portion and to thus prevent an observer from being subjected to potential glare. It should be noted that the combined presence of the microstructures on the entrance face for the rays and of diffractive structures on the prisms on the exit face for these rays allows the number of diffractive structures required to decrease the chromatic aberration at the cutoff of the beam to be decreased, and therefore the risk that an observer will be subjected to glare to be decreased. Thus, the asymmetry in rotation of the prisms must be less pronounced, this imposing more respectable manufacturing constraints. Such an asymmetry in rotation of the Fresnel prisms may in particular be implemented in a lens that is asymmetric in revolution;

the entrance face for the rays is convex. The convexity of a face of the lens is defined with respect to the lens itself, i.e. with respect to a central layer thereof; in other words, the entrance face of the lens is convex in that it has an embossment, i.e. a profile that is curved toward the exterior of the lens: the central portion of the entrance face is thus more to the exterior of this lens than are the edges of this entrance face. The fact that the entrance face is convex participates in the increase of the optical power of the lens and this thus allows the optical power that must be generated by the front face to be limited. Thus, the angles that the prisms forming the Fresnel structure of the front face must have are decreased, this implying, the prisms being arranged with a constant pitch, that it is possible to decrease the height or depth of the prisms and thus to facilitate their production;

the curvature of the entrance face may be calibrated so that the thickness at the centre of the lens is smaller than 10 millimetres. In this context, provision may be made for the thickness at the centre of the lens to be larger than the thickness on the border thereof, in a ratio of at least 2 to 1;

the entrance face for the rays has a zone of regular profile, extending over most of its area, and a zone of rupture of the profile;

this zone of rupture of the profile may in particular be produced by removing material from the lens at the level of the entrance face, and it may be arranged on the periphery of this entrance face. It will be understood that in this zone of rupture of the profile, the deviation of the light rays is modified, and this zone of rupture is advantageously placed in an upper portion of the lens, so that the rays the deviation of which is amplified are folded down on exiting the lens. With such an arrangement, in which the zone of rupture of profile is an upper section of the lens when the latter is in place in the vehicle, the rays incident on the zone of rupture of profile are directed downward, thereby once again limiting the potential glare to which road users are subjected. Such a zone of rupture in particular allows the fusion between two different beams, for example the high beam and low beam, in the case of dual-function modules, to be improved;

the microstructures arranged on the entrance face are localized at least to the zone of regular profile, and they may extend furthermore into the zone of rupture of profile;

the microstructures are arranged on the entrance face for the rays so as to present a succession of depressions and/or embossments of small depth or thickness;

the microstructures have a width that is similar from one microstructure to the next, width being their dimension in a direction perpendicular to a longitudinal direction, the longitudinal direction being a direction parallel to an optical axis of the lighting module;

neighbouring microstructures have therebetween a constant pitch that may have a value comprised between 0.1 millimetre to 2 millimetres. The microstructures are arranged so that each microstructure lies at a distance comprised between 0.1 and 2 millimetres from a neighbouring microstructure;

the depth of the microstructures may vary from the centre of the exit face of the lens up to its periphery;

a microstructure is also characterized by its depth. Here a similar width is preferred for each of the microstructures rather than a similar depth, more for reasons of visual appearance as seen by an exterior observer then for reasons of lighting efficacy. It will of course be understood that either one of the alternatives could be implemented without departing from the context of the invention;

the microstructures arranged on the entrance face are spaced apart from one another by at least one recess. A recess between two microstructures has a depth from 1 to 10 microns.

The present invention also relates to a lighting module including at least one light-ray-emitting assembly and one ray-shaping lens according to the preceding aspect. The expression "emitting assembly" is understood to mean that the lighting module may include one or more light sources forming a given emitting assembly that is positioned with respect to the object focal point of the ray-shaping lens, and that is, where appropriate, associated with a reflector for directing the rays suitably onto the entrance face of the lens, in order that the rays emitted by this emitting assembly mainly exit via the first section of the exit face of the lens in order to form a regulatory lighting and/or signalling beam.

The present invention also relates to a motor-vehicle headlamp including a lighting module such as described above, the headlamp including a casing for housing at least this lighting module, said casing being closed by a protective outer lens.

Other attributes and advantages of the present invention will become more clearly apparent from the description and the drawings, in which.

It should firstly be noted that although the figures illustrate the invention in detail with regard to implementation thereof and that they may, where appropriate, be used to better define the invention, these figures illustrate only some of the possible embodiments according to the invention.

Figure 1:
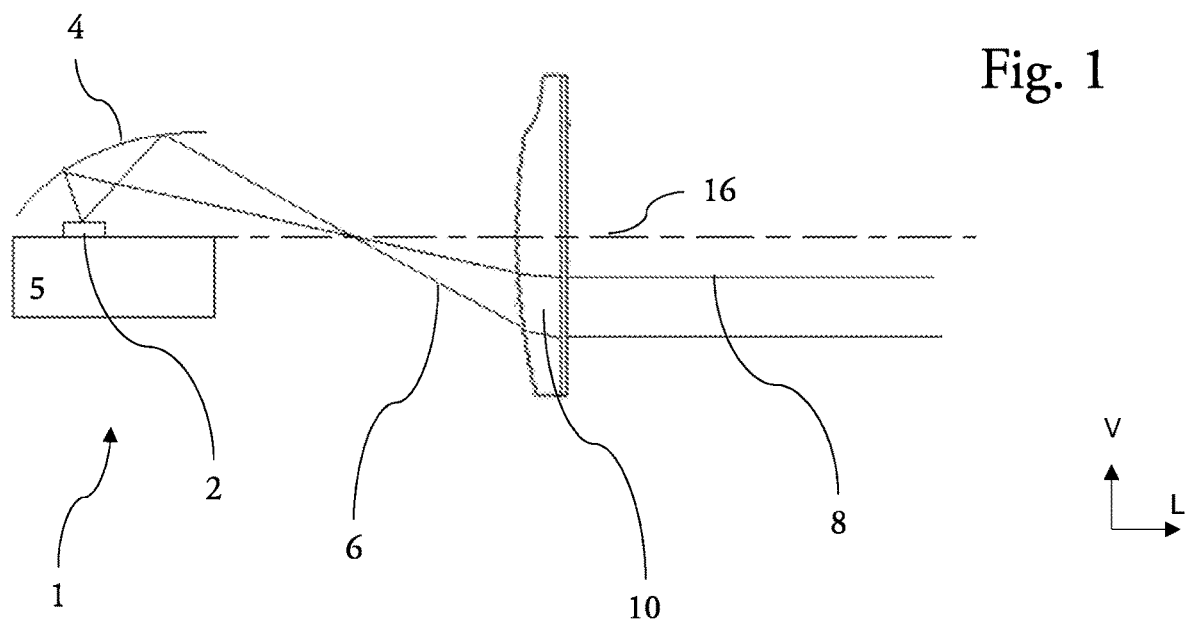
FIG. 1 is a cross-sectional view of a lighting module comprising a light source and a ray-shaping lens according to the invention.

Thus, FIG. 1 shows an example of a lighting module 1 that comprises an emitting assembly 5 and a lens 10 for shaping light rays 6, and that may be installed in a motor vehicle.

The lighting module illustrated here comprises a single light source 2 by way of emitting assembly 5. The light source 2 emits light radiation in the direction of a reflector 4, the light rays 6 being reflected by this reflector 4, which is placed facing the light source 2, in the direction of the shaping lens 10. The light source 2 used may be a filament-, plasma-, or gas-based light source, or comprise electroluminescent elements such as a light-emitting diode (LED), an organic light-emitting diode (OLED) or a polymer light-emitting diode (PLED), or any light source meeting the regulatory constraints of the automotive field.

The reflected light rays 6 then reach the shaping lens 10, by means of which they are deviated so as to form, on exiting the lens, a regulatory light beam 8 meeting the desires of a user of the vehicle, both in terms of its shape and in terms of its direction. The light beam 8 is thus projected, for example toward in front of the vehicle in order to light the route taken or to provide a signalling function. The light beam 8 obtained is divergent, i.e. the light rays from which it is formed seem to come from the same point. In addition, the light beam 8 obtained is collimated, i.e. the light rays from which it is composed are parallel or almost parallel, this allowing lighting that is long-range and uniform, and therefore more comfortable for the driver of the vehicle, to be obtained.

The shaping lens 10 comprises an entrance face 12 for the rays 6, and an exit face 14 for these light rays 6, the exit face 14 being opposite to the entrance face 12 with respect to a central layer 36 of the lens 10. The light rays 6 emitted by the light source 2 reach the entrance face 12 and pass through the lens 10 in order to exit via the exit face 14 of the lens 10.

The shaping lens 10 has the shape of a flat lens, i.e. a lens a thickness of which, i.e. the dimension between the entrance face 12 and the exit face 14, is small, i.e. smaller than the largest dimension of the exit face 14.

In the example described here, the lens 10 is of circular shape, this circular shape extending around an axis 16 that substantially forms the optical axis of the lens 10. It will be understood on reading what follows that other flat-lens shapes may be envisaged.

Likewise, the lens 10 here is positioned perpendicularly to the axis 16, but it will be understood that this arrangement is given here by way of example and does not restrict the scope of the invention nor indeed represent a preferred embodiment.

Figure 2:
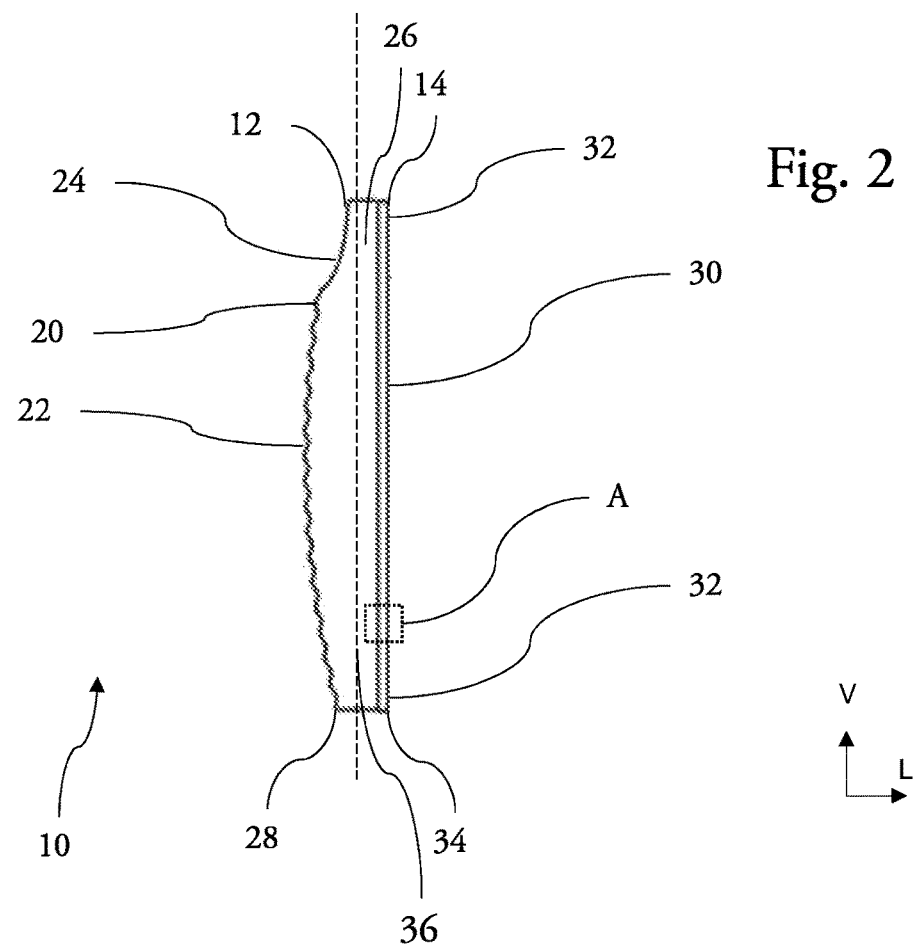
FIG. 2 is a cross-sectional view of a lens according to the invention.

The shaping lens 10 may more particularly be seen in FIG. 2. In FIG. 2 it is possible to see that the entrance face 12 has a convex shape, the lens 10 being thicker in its portion closest to the axis 16 than in a portion further from the axis 16. This configuration is in particular visible because of the curved aspect of the entrance face 12 of the lens 10.

The entrance face 12 also includes a plurality of microstructures 20, which are arranged to improve the uniformity of the light beam 8 emitted by the lighting module 1, this improving the visual comfort of the driver by limiting the possible contrasts within the light beam 8. The microstructures 20 take the form of a succession of depressions and/or embossments, which are regularly distributed over the entrance face 12 of the lens 10. These depressions and/or embossments respectively have thicknesses or depths of dimensions of about one micron, and hence these microstructures are imperceptible to the naked eye.

Via their shape, these microstructures 20 thus form a graining on at least one portion of the entrance face 12, and more particularly in a zone 22 of regular profile. In the illustrated example, this zone 22 of regular profile extends over the entirety of the entrance face 12, with the exception of a zone 24 of rupture of the profile, which zone is placed in a peripheral portion 25, i.e. the portion of the lens lying at the greatest distance from the axis 16 in a direction perpendicular to this axis 16. More particularly, the zone 24 of rupture of profile is placed in an upper portion 26 of the lens 10. The peripheral portion 25 is thus said to be upper relative to the position of the lens 10 in the vehicle, this position corresponding to the orientation given in FIG. 2.

The zone 24 of rupture of the profile forms a concave notch in the thickness of the upper portion 26 of the flat lens 10. In accordance with what was written above with respect to the convex general shape of the entrance face 12, the notch is concave in the sense that a centre of the notch is closer to the central layer 36 than peripheral edges of said notch.

Arranged in this way, the lens 10 deviates light rays 6 reaching the zone 32 of rupture of the profile more substantially, thereby limiting the light rays that are able to blind a driver of an oncoming vehicle.

The zone 24 of rupture of the profile is smooth, i.e. it includes no microstructures 20. The microstructures 20 present on the entrance face 12 of the lens 10 are thus concentrated in the zone 22 of regular profile.

The microstructures 20 are separated from one another by a constant pitch. This pitch is comprised between 0.1 and 2 millimetres. It is the multiplication of these microstructures 20, which are separated by a pitch that is constant at every point on the entrance face 12, which forms the graining of the entrance face 12.

The microstructures 20 may each be defined by a width, which is the dimension in a direction parallel to the plane in which the lens 10 mainly extends, and by a depth, which is the dimension in a direction perpendicular to the plane in which the lens 10 mainly extends.

The width of a microstructure 20 is comprised between 1 micron and 1 millimetre. Furthermore, the depth of a microstructure 20 is comprised between 1 micron and 1 millimetre.

In the example described here, the microstructures 20 all have the same width and the same depth. However, it will be understood that it is possible to have microstructures 20 the width, the depth and/or the spacing of which vary as a function of the position of the given microstructure 20 on the entrance face 12.

The exit face 14 of the lens 10 is essentially planar, i.e. it extends in a plane parallel to a main plane of elongation of the central layer 36 of the lens 10. In other words, the exit face 14 of the lens 10 is neither convex nor concave. Thus, the exit face 14 does not have the convexity of the entrance face 12 or the concavity of the notch characterizing the zone 24 of rupture of profile. The exit face 14 is said to be essentially planar in so far as it does not have a smooth surface, the exit face 14 comprising a plurality of prisms 40, 41.

The prisms 40, 41 placed on the exit face 14 form a Fresnel structure, and provision is made for diffractive structures 60 on a plurality of these prisms. The arrangement of the prisms 40, 41 is illustrated in FIGS. 3 and 4, the configuration of the diffractive structures 60 being described in FIGS. 5 and 6.

The exit face 14 comprises a central zone of 13 and a peripheral zone 32. The peripheral zone 32 extends between the central zone 30 of the lens 10 and an exterior border 34 that bounds the lens 10.

Figure 3:
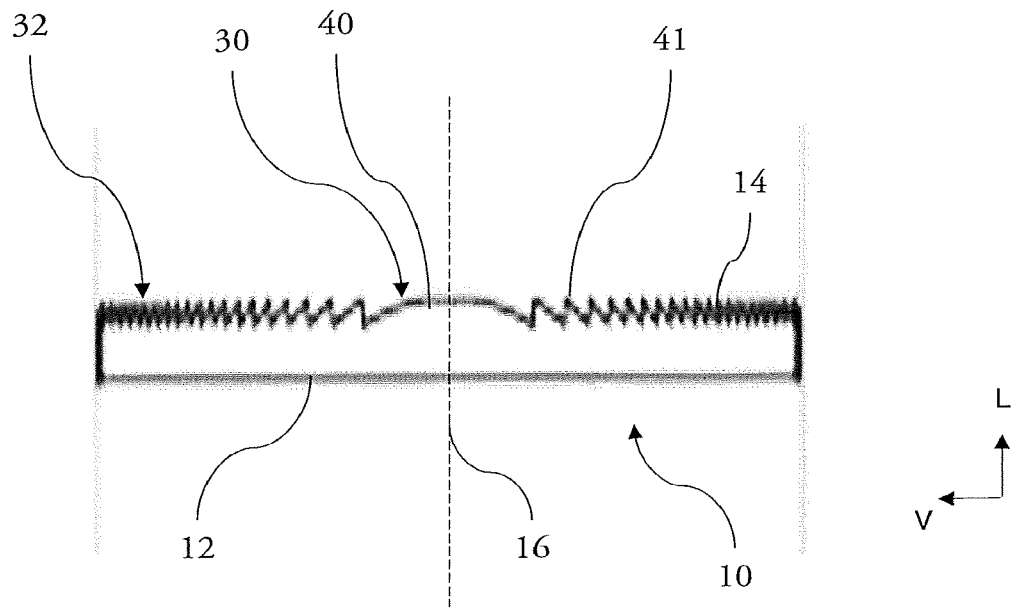
FIG. 3 is a top view of the lens according to the invention.
Figure 4:
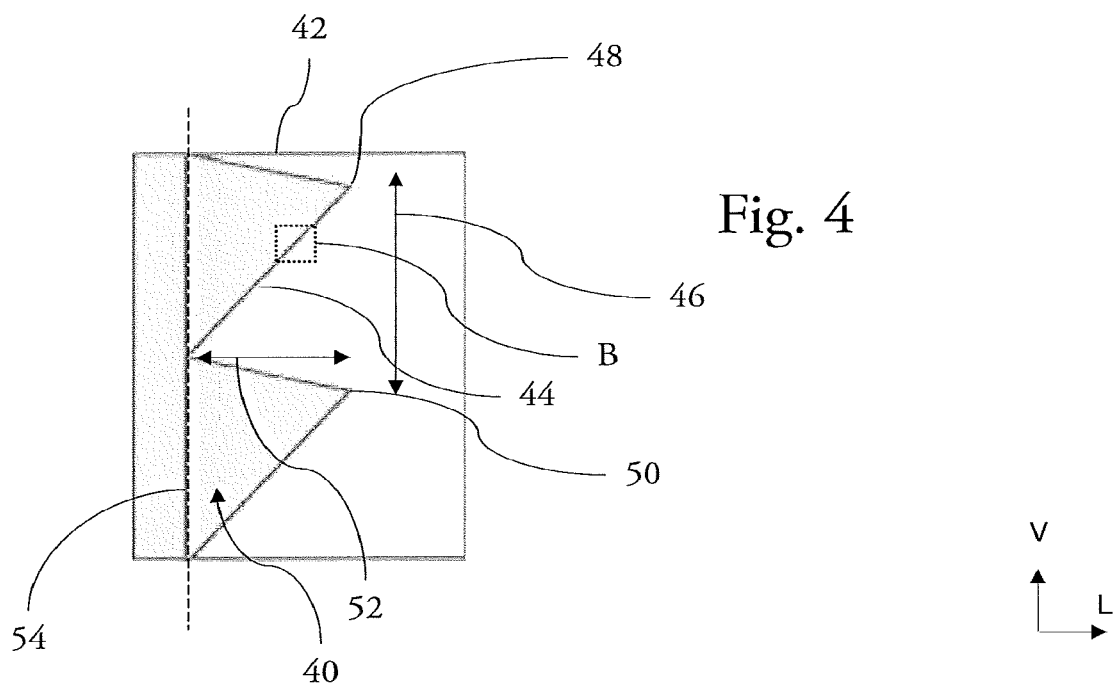
FIG. 4 is a cross-sectional view of a detail of the lens according to the invention and illustrated in FIG. 2 by the reference A.

FIG. 3 more particularly illustrates the central zone 30, the peripheral zone 35 and the prisms 40, 41 placed in these zones.

The central zone 30 comprises what is called a central prism 40, of hemispherical shape. This central prism 40 is positioned on an optical axis of the lens 10. In the example illustrated here, the optical axis of the lens 10 corresponds to the axis 16 illustrated in FIG. 1.

The peripheral zone 32 comprises a plurality of what are called peripheral prisms 41 extending in contact with one another without interruption, from the central prism 40 to the exterior border 34 of the lens 10. A peripheral prism 41 has a ring shape, of triangular cross section. All of the prisms, i.e. the central prism 40 and the peripheral prisms 41, together give the exit face 14 of the lens 10 a Fresnel-lens shape.

FIG. 4 more particularly illustrates the arrangement of the peripheral prisms 41 on the exit face 14 of the shaping lens 10.

A peripheral prism is in particular characterized by a height 52 of between 1 micron and 1 millimetre. In the example described here, the height 52 of the prisms 41 is comprised between 50 and 300 microns. The height 52 of a prism is measured between a vertex 42 of the prism and a plane 54 passing through points of contact between the prism and the adjacent peripheral prisms, in a direction perpendicular to this plane 54. The vertex 48 of a prism is the point of the prism furthest from the central layer 36 of the lens 10.

The prisms have therebetween a pitch 46 comprised between 100 microns 1 millimetre, measured between the vertex 48 of the prism, and a second vertex 50 of an adjacent prism. The prisms of the exit face 14 have the same pitch 46.

The peripheral prisms 41 are asymmetric in rotation. In other words, the height 52 of a peripheral prism 41 varies depending on the point of the peripheral prism 41 considered, the pitch 46 between two directly adjacent peripheral prisms being constant at every point on the exit face 14 of the lens 10.

In this arrangement, the prismatic power of a given peripheral prism 41 differs depending on the point considered, the prismatic power increasing at the same time as distance in the vertical direction V with respect to the centre 16 of the lens 10. Thus, the prismatic power of a first point located in a portion of the prism 41 placed in the upper portion 26 of the lens 10 is higher than the prismatic power of a second point that is an image of the first point via a symmetry with respect to a horizontal plane passing through the axis 16. The upper portion 26 of the lens 10 is upper relative to the position of the lens 10 in the vehicle, this position corresponding to the orientation given in FIG. 2.

Two points of the peripheral prism 41 that are images of each other via a symmetry with respect to a vertical plane passing through the axis 16 have the same prismatic power.

The optical power of the lens 10 is thus different depending on the point of the exit face 14 considered. In this arrangement, the average optical power of the upper portion 26 of the lens is higher than the average optical power of a lower portion 28 of the lens 10, the optical power of a peripheral prism 41 being higher in the upper portion of the lens than in the lower portion of this lens.

A peripheral prism 41 has an interior face 42, or draft face, that is directed in the direction of the central zone 30 of the lens 10, and an exterior face 44, or optical face, that is directed toward the exterior border 34 of the lens 10. Light rays 6 passing through the lens 10 are liable to exit via the exterior face 44.

The exterior face 44, or optical face, of the peripheral prism 41 comprises at least one diffractive structure 60, the interior face 42, or draft face, being smooth, i.e. devoid of diffractive structures 60.

In the illustrated example, the central prism 40, which as explained above may have an aspherical or spherical shape, is devoid of diffractive structures 60 on its surface. More particularly, provision may be made for a lens on a face of which a central zone, namely the central prism and a few of the peripheral prisms, is devoid of diffractive structures, by way of example over a diameter of 5 to 20 millimetres.

The diffractive structures 60 have a triangular prism shape, the base of which makes contact with the prism, and in particular the peripheral prism 41 bearing the diffractive structure 60.

The arrangement of the diffractive structures 60 on the exterior face 44 of the prisms allows the appearance of chromatic aberrations within or on the border of the collimated light beam to be limited by correcting the decomposition of the light passing through the lens 10.

The prisms and the diffractive structures 60 are all optical elements, i.e. elements having an impact on the scattering of the light rays 6 emitted by the light source 2, allowing the desired light beam 8 to be obtained.

Figure 5:
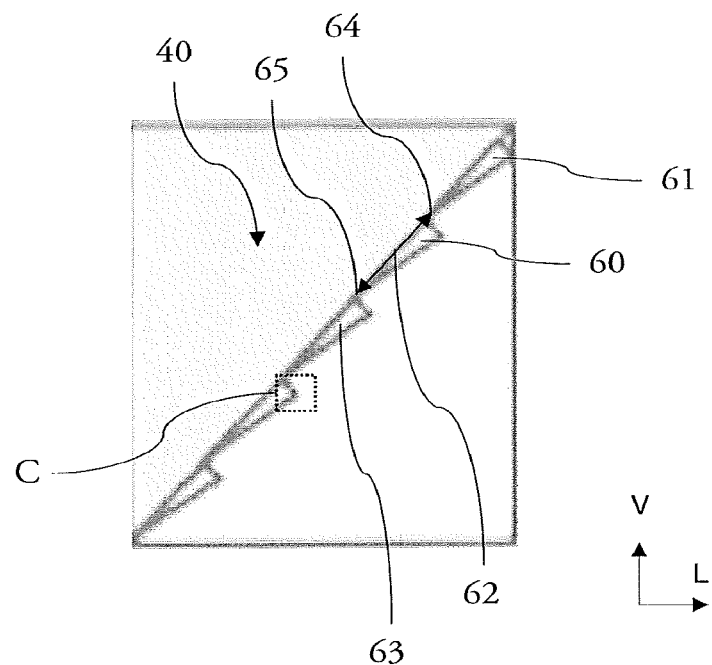
FIG. 5 is a cross-sectional view of a detail of the lens according to the invention and illustrated in FIG. 4 by the reference B.

FIG. 5 more particularly illustrates diffractive structures 60 placed on the exterior face 44 of a peripheral prism 41 and certain of their attributes.

Two adjacent diffractive structures 60 are separated by a pitch 62 comprised between 1 micron and 1 millimetre. More particularly, this pitch 62 is measured between a first point of contact 64 between a diffractive structure 60 and a first adjacent diffractive structure 61 and a second point of contact 65 between a diffractive structure 60 and a second adjacent diffractive structures 63.

The average pitch 62 between the diffractive structures 60 of a peripheral prism 41 is larger than the average pitch 62 between the diffractive structures 60 of a neighbouring prism placed between the peripheral prism 41 and the exterior border of the lens 10.

Figure 6:
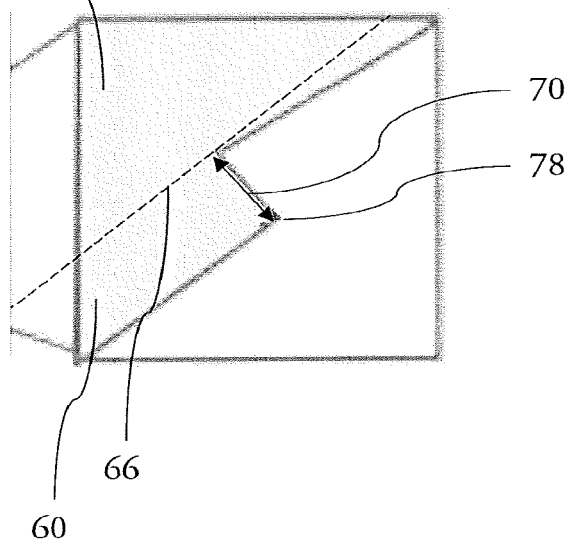
FIG. 6 is a cross-sectional view of a detail of the lens according to the invention and illustrated in FIG. 5 by the reference C.

FIG. 6 more particularly illustrates certain attributes of a diffractive structure 60.

The diffractive structure 60 has a height 70 comprised between 0.1 and 10 microns. The height 70 of a diffractive structure 60 is measured between the vertex 78 of the diffractive structure 60 and a plane 66 passing through the exterior face 44 of the prism bearing the diffractive structure 60, in a direction perpendicular to the plane in question.

On a given peripheral prism 41, the diffracting structures 60 are of equal or substantially equal height 70 given the manufacturing tolerances. The height 70 of the diffracting structures 60 of a given first peripheral prism 41 is smaller than the height 70 of the diffractive structures 60 of a second peripheral prism 41 placed between the first prism 40 in question and the exterior border 34 of the lens 10.

Of course, various modifications may be made by those skilled in the art to the shaping lens according to the invention, provided that an exit face equipped with prisms at least one of which is equipped on an exterior face with diffractive structures, and an entrance face equipped with at least partially with microstructures, are employed.

In any case, the invention is not limited to the embodiment specifically described in this document, and particularly encompasses any equivalent means and any technically workable combination of these means.

The invention claimed is:

1. A vehicle lighting module including a lens for shaping light rays for lighting or signaling, the lens comprising:
   a light entrance face for receiving the light rays; and
   an opposite exit face having a flat-lens shape equipped with prisms forming a Fresnel structure, at least one of these prisms being equipped on an exterior face with light diffractive structures,
   wherein the light entrance face of which is at least partially equipped with microstructures having a constant pitch and partially equipped with a structure different from the microstructure.

2. The vehicle lighting module according to claim 1, wherein the prisms extend continuously over the exit face of the lens.

3. The vehicle lighting module according to claim 2, wherein the prisms are distributed between a central zone of the exit face, in which the exterior face of the prisms is smooth, and a peripheral zone of the exit face, in which the exterior face of the prisms is equipped with said light diffractive structures.

4. The vehicle lighting module according to claim 2, wherein the light diffractive structures have a height that increases with distance from a centre of the exit face of the lens.

5. The vehicle lighting module according to claim 2, wherein the light diffractive structures arranged on a prism have therebetween a pitch, the average pitch between the light diffractive structures of a prism being larger than the average pitch between the light diffractive structures of a neighbouring prism placed toward the periphery of the lens.

6. The vehicle lighting module according to claim 2, wherein the prisms are arranged on the exit face in the form of concentric ring-section or ring patterns.

7. The vehicle lighting according to claim 2, wherein the light entrance face of the lens is convex.

8. The vehicle lighting module according to claim 2, wherein the microstructures are produced on the light entrance face of the lens so as to have a succession of depressions or embossments having depths in a range of 1 micron and 1 millimeter.

9. The vehicle lighting module according to claim 2, further comprising at least one light-ray-emitting assembly.

10. The vehicle lighting module according to claim 1, wherein the prisms are distributed between a central zone of the exit face, in which the exterior face of the prisms is smooth, and a peripheral zone of the exit face, in which the exterior face of the prisms is equipped with said light diffractive structures.

11. The vehicle lighting module according to claim 1, wherein the light diffractive structures have a height that increases with distance from a centre of the exit face of the lens.

12. The vehicle lighting module according to claim 1, wherein the light diffractive structures arranged on a prism have therebetween a pitch, the average pitch between the diffractive structures of a prism being larger than the average pitch between the light diffractive structures of a neighbouring prism placed toward the periphery of the lens.

13. The vehicle lighting module according to claim 1, wherein the prisms are arranged on the exit face in the form of concentric ring-section or ring patterns.

14. The vehicle lighting module according to claim 13, wherein the prisms arranged on the exit face are asymmetric in rotation.

15. The vehicle lighting module according to claim 1, wherein the light entrance face of the lens is convex.

16. The vehicle lighting module according to claim 1, wherein the microstructures are produced on the light entrance face of the lens so as to have a succession of depressions or embossments having depths in a range of 1 micron and 1 millimeter.

17. The vehicle lighting module including at least one light-ray-emitting assembly and one lens for shaping rays according to claim 1.

18. A motor-vehicle headlamp including the lighting module according to claim 17, wherein the headlamp includes a casing for housing at least the lighting module, said casing being closed with a protective outer lens.

19. A lens for shaping light rays for a lighting module for lighting or signaling of a motor vehicle, comprising:
   a light entrance face for receiving the light rays; and
   an opposite exit face having a flat-lens shape which is equipped with prisms forming a Fresnel structure, at least one of these prisms being equipped on an exterior face with diffractive structures,
   wherein the light entrance face is at least partially equipped with microstructures, and
   wherein the entrance face of the lens has a zone of regular profile, extending over most of its area, and a zone of rupture of the profile.

20. A lens for shaping light rays for a lighting module for lighting or signaling of a motor vehicle, comprising:
   a light entrance face for receiving the light rays; and
   an opposite exit face having a flat-lens shape which is equipped with prisms forming a Fresnel structure, at least one of these prisms being equipped on an exterior face with diffractive structures,
   wherein the light entrance face is at least partially equipped with microstructures,
   wherein the prisms extend continuously over the exit face of the lens, and
   wherein the entrance face of the lens has a zone of regular profile, extending over most of its area, and a zone of rupture of the profile.

* * * * *